United States Patent
Nam et al.

(10) Patent No.: US 6,954,251 B2
(45) Date of Patent: Oct. 11, 2005

(54) METHOD OF FILLING LIQUID CRYSTAL DISPLAY PANEL WITH LIQUID CRYSTAL AND LIQUID CRYSTAL FILLING SYSTEM PERFORMING THE SAME

(75) Inventors: Hyo-Hak Nam, Suwon-si (KR); Bong-Woo Lee, Cheonan-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 51 days.

(21) Appl. No.: 10/445,850

(22) Filed: May 28, 2003

(65) Prior Publication Data
US 2003/0231278 A1 Dec. 18, 2003

(30) Foreign Application Priority Data
Jun. 14, 2002 (KR) .......................................... 2002-33324

(51) Int. Cl.[7] ............................................. G02F 1/1339
(52) U.S. Cl. ........................ 349/189; 349/187; 349/190
(58) Field of Search .................................. 349/187–191

(56) References Cited

U.S. PATENT DOCUMENTS 5,263,888 A * 11/1993 Ishihara et al. ............... 445/25
6,335,779 B1 * 1/2002 Morii et al. ................. 345/155
2002/0063842 A1 * 5/2002 Gyoda ......................... 349/187

* cited by examiner

Primary Examiner—Dung T. Nguyen
Assistant Examiner—Thanh-Nhan P. Nguyen
(74) Attorney, Agent, or Firm—McGuireWoods LLP (57) ABSTRACT

In a method of filling a liquid crystal display panel with liquid crystal and a liquid crystal filling system using the method, a seal line and spacers are formed on a color filter substrate. A first volume defined by the seal line and a second volumes defined by the spacers are obtained. An amount of liquid crystal to be supplied into a region enclosed by the seal line is precisely calculated based on the first and second volumes. Shortage of the liquid crystal supplied into the LCD panel and overflow of the liquid crystal can be avoided. Accordingly, the steps for supplying the liquid crystal into the LCD panel may be reduced, and simultaneously peripheral regions of the LCD panel be prevented from being contaminated by the liquid crystal while the liquid crystal is filled into the LCD panel.

35 Claims, 8 Drawing Sheets

FIG.12

METHOD OF FILLING LIQUID CRYSTAL DISPLAY PANEL WITH LIQUID CRYSTAL AND LIQUID CRYSTAL FILLING SYSTEM PERFORMING THE SAME

CROSS-REFERENCE TO RELATED APPLICATIONS

This application relies for priority upon Korean Patent Application No.2002-33324 filed on Jun. 14, 2002, the contents of which are herein incorporated by reference in its entirety.

BACKGROUND OF THE INVENTION

1. Field of the Invention

The present invention relates to a method of filling a liquid crystal display panel with liquid crystal and a liquid crystal filling system for performing the same.

2. Description of the Related Art

Generally, liquid crystal is interposed between a TFT substrate and a color filter substrate of a liquid crystal display panel.

The liquid crystal is affected by an electric field formed between the TFT substrate and the color filter substrate. In detail, the liquid crystal varies the transmissivity of the light supplied from an external light source depending on the electric field applied thereto, so that full-color images required by users can be displayed.

The TFT substrate and the color filter substrate have a cell gap for receiving the liquid crystal.

Since the cell gap has a size of a few micrometers ($\mu$m), a special method is required to uniformly supply liquid crystal over the entire area of the cell gap.

In order to fill the liquid crystal into the cell gap, firstly, a part of a liquid crystal display panel having the cell gap is firstly immersed into the liquid crystal contained in a barrel. Then, since vacuum pressure is formed in the cell gap, the liquid crystal is sucked into the cell gap.

The above method of filling liquid crystal using vacuum pressure has an advantage that the liquid crystal can be completely filled in the cell gap having the size of a few micrometers ($\mu$m), such that no empty area remains in the cell gap. However, an excessive amount of liquid crystal may be supplied into the cell gap.

For this reason, the above method of filling liquid crystal using vacuum pressure requires additional processes such as a pressing process for discharging excessively injected amount of liquid crystal, a liquid crystal sealing process for sealing an inlet and an outlet, through which the liquid crystal is respectively injected and discharged, with sealing materials, and a cleaning process for cleaning the liquid crystal remaining on an outer surface of the liquid crystal display panel.

Besides the liquid crystal filling method using vacuum-pressure, a second liquid crystal filling method has been recently developed.

According to the second liquid crystal filling method, first, the liquid crystal is dropped onto the color filter substrate. Then, the TFT substrate is bonded to the color filter substrate such that the liquid crystal is filled between the TFT substrate and the color filter substrate.

The second liquid crystal filling method may fill the liquid crystal between the TFT substrate and the color filter substrate in a relatively simple manner compared with the liquid crystal filling method using vacuum-pressure. However, according to the second liquid crystal filling method, bubbles are generated inside the liquid crystal display panel or the liquid crystal overflows the liquid crystal display panel.

For example, when an excessive amount of liquid crystal is supplied into the color filter substrate, the excessive amount of liquid crystal overflows outside of the liquid crystal display panel. On the contrary, when the liquid crystal is insufficiently supplied into the color filter substrate, a bubble area is formed inside the liquid crystal display panel. Since liquid crystal does not exist in the bubble area, image may not be displayed in the bubble area.

Accordingly, in the second liquid crystal filling method, it is important to determine a precise amount of liquid crystal to be supplied into the liquid crystal display panel.

The amount of liquid crystal supplied into the liquid crystal display panel is determined depending on a volume of spacers and an internal volume defined by a region enclosed by a seal line formed on the color filter substrate.

However, the internal volume and the volume of the spacers used for determining the amount of liquid crystal to be supplied may be varied depending on the liquid crystal filling process.

Especially, the volume of the spacers remarkably varies depending on substrates because of differences in the prosess of forming spacers.

The spacers are randomly attached to the region enclosed by the seal line of the color filter substrate by means of a spacer disperser. Since a random number of spacers are attached to the region enclosed by the seal line, measuring the total volume of the spacers is difficult.

For this reason, it is difficult to precisely calculate the total volume of the spacers. Therefore, the amount of liquid crystal to be supplied may not be precisely calculated.

On the other hand, the spacers may be formed through a process of patterning a photoresist film. In this case, a predetermined number of spacers are attached to predetermined positions on the substrate, so that the total volume of the spacers can be roughly calculated.

However, since a height of the photoresist film has a deviation depending on the positions on the substrate, the volume of the spacers may slightly vary depending on the positions of the spacer on the substrate. Therefore, it is difficult to precisely calculate the total volume of the spacers and the amount of liquid crystal to be supplied.

SUMMARY OF THE INVENTION

The present invention has been made to solve the above problems of the prior arts, therefore, it is a one feature of the present invention to provide a method of filling liquid crystal into a liquid crystal display panel, which reduces process failures such as shortage of the liquid crystal supplied into the liquid crystal display panel and overflow of the liquid crystal. In the method of filling the liquid crystal, process parameters influencing an amount of the liquid crystal to be supplied into the liquid crystal display panel may be precisely measured, the amount of the liquid crystal to be supplied is calculated based on the measured process parameters, and the calculated amount of the liquid crystal is supplied into the liquid crystal display panel.

In addition, it is a another feature of the present invention to provide a liquid crystal filling system that reduces process failures such as shortage of the liquid crystal supplied into the liquid crystal display panel and overflow of the liquid crystal. In the liquid crystal filling system, process parameters influencing an amount of the liquid crystal to be supplied may be precisely measured, the amount of the liquid crystal to be supplied is calculated based on the measured process parameters, and the calculated amount of the liquid crystal is supplied into the liquid crystal display panel.

To achieve one feature of the present invention, there is provided a method of filling a liquid crystal display panel with liquid crystal. After obtaining a first volume defined by a region enclosed by a seal material, the seal material is formed on a peripheral portion of a first substrate so as to seal the liquid crystal. A second volume occupied by at least one spacer is obtained, and the at least one spacer is disposed in the region enclosed by the seal material. A third volume is obtained. The third volume corresponds to a difference between the first volume and the second volume. An amount of the liquid crystal corresponding to the third volume is calculated so as to provide the region enclosed by the seal material with the amount of liquid crystal. A second substrate is covered over the first substrate to seal the liquid crystal.

To achieve another feature of the present invention, there is provided a liquid crystal filling system. The liquid crystal filling system includes first, second, third, fourth, fifth means. The first means obtains image data of a seal material and at least one spacer. The seal material is formed on a peripheral portion of a first substrate so as to seal the liquid crystal, and the spacer is disposed in the region enclosed by the seal material. The second means measures a height of the seal material and a height of the spacer to produce height data. The third means calculates an amount of the liquid crystal to be filled into the region enclosed by the seal material based on the image data and the height data. The fourth means provides the region enclosed by the seal material with the amount of the liquid crystal calculated by the third means. The fifth means covers a second substrate over the first substrate to seal the liquid crystal.

According to a preferred exemplary embodiment of the present invention, the volume of the region enclosed by a seal line acting as a sealing wall for sealing liquid crystal is calculated, the volume of the spacers is calculated, and the amount of the liquid crystal is calculated. Accordingly, the calculated amount of the liquid crystal can be supplied into a region enclosed by the seal line using reduced steps.

As described above, according to the present invention, liquid crystal is filled between two substrates so that the number of the steps for sealing the liquid crystal can be reduced, and the processing time required for sealing the liquid crystal can be minimized. In addition, bubbles generated while the liquid crystal is insufficiently filled between two substrates can be reduced, and overflowing of liquid crystal due to excessive amount of liquid crystal can be prevented.

BRIEF DESCRIPTION OF THE DRAWINGS

The above objects and other advantages of the present invention will become more apparent by describing in detail preferred exemplary embodiments thereof with reference to the attached drawings in which.

DESCRIPTION OF THE PREFERRED EMBODIMENTS

Hereinafter, preferred exemplary embodiments of the present invention will be described in detail with reference to accompanying drawings.

Figure 1:
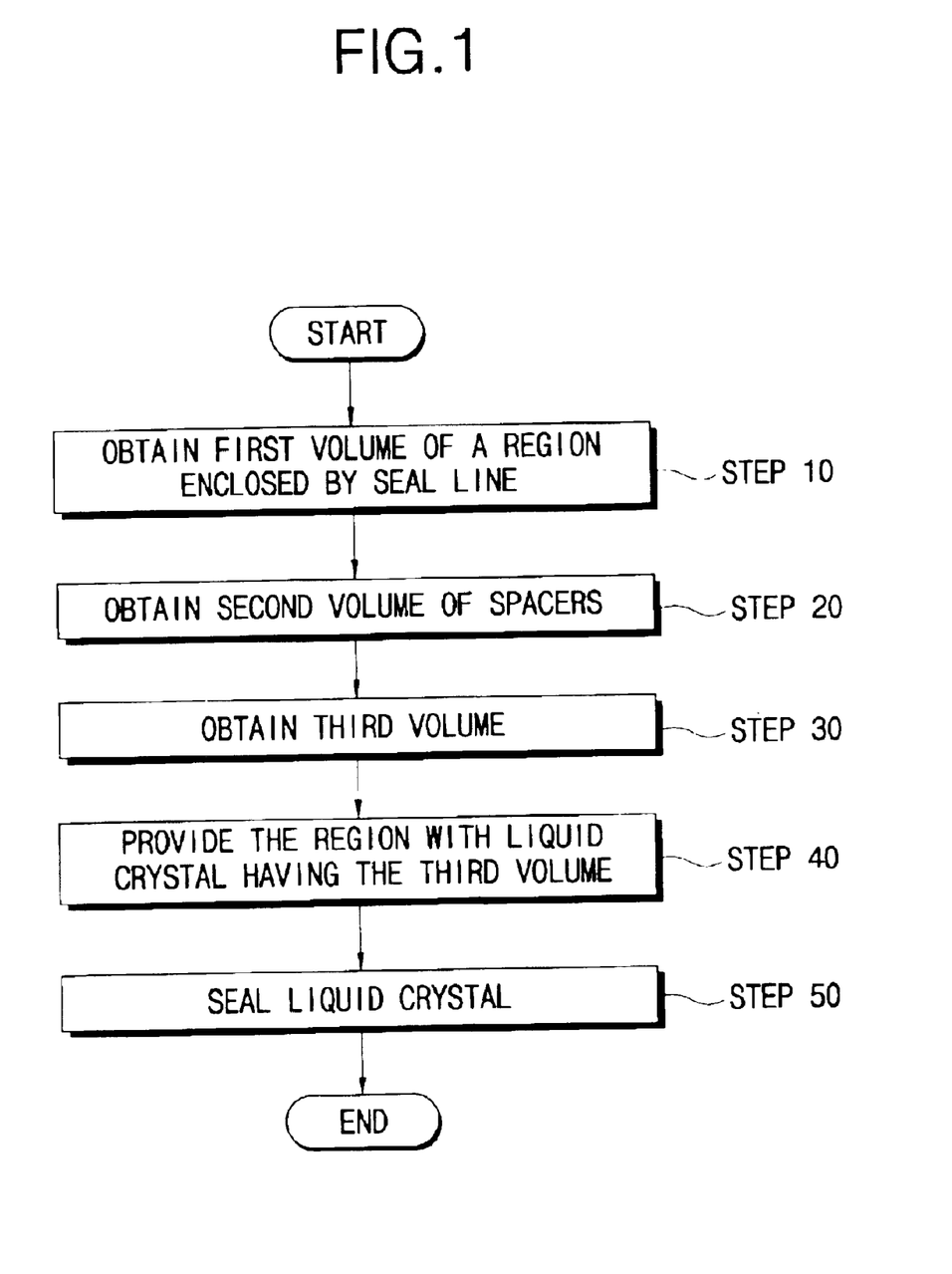
FIG. 1 is a flow chart showing a method of filling a liquid crystal display panel with liquid crystal according to one exemplary embodiment of the present invention.

FIG. 1 is a flow chart showing a method of filling a liquid crystal display panel with liquid crystal according to one exemplary embodiment of the present invention.

Referring to FIG. 1, the method of filling a liquid crystal display panel with liquid crystal mainly includes five steps (steps 10, 20, 30, 40 and 50).

A first volume is obtained in step 10. The first volume is defined by a volume of a region enclosed by a seal line formed on a first substrate (TFT substrate). The seal line is comprised of seal material that is formed on a peripheral portion of the first substrate so as to seal the liquid crystal.

The first volume varies depending on an area and a height of a region enclosed by the seal line.

Figure 2:
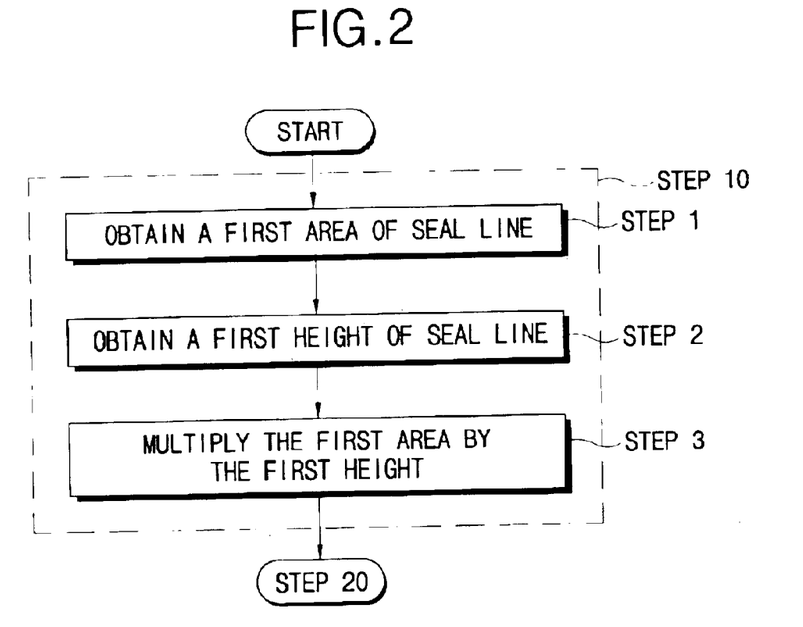
FIG. 2 is a flow chart showing the steps of obtaining the first volume of FIG. 1.

FIG. 2 is a flow chart showing the steps of obtaining the first volume of FIG. 1. As shown in FIG. 2, the first volume is obtained through three steps (steps 1, 2 and 3).

Referring to FIG. 2, a first area of a first substrate surrounded by the seal line is obtained in step 1. The first area is defined by an area of a surface surrounded by an inner wall of the seal line.

Figure 3:
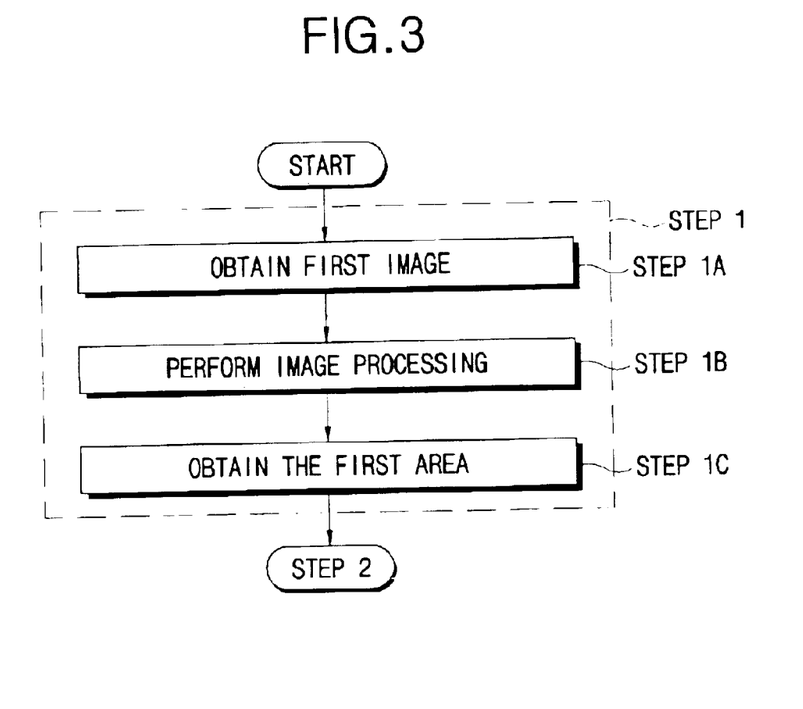
FIG. 3 is a flow chart showing the steps of obtaining the first area of FIG. 1.

FIG. 3 is a flow chart showing the steps of obtaining the first area of FIG. 1.

Referring to FIG. 3, the first area is obtained through three steps (steps 1A, 1B and 1C).

As shown in FIG. 3, an image of the seal line formed on the first substrate is obtained in step 1A.

In step 1B, the obtained image is transformed into an image datum by an image processing technique.

According to a preferred exemplary embodiment of the present invention, the seal line has a rectangular shape having four sidewalls.

A width data between a first sidewalls and a second sidewall facing the first sidewall are obtained from the image data, and a length datum between a third sidewall and a fourth sidewall is also obtained from the image datum. The width and length data obtained in step 1B are temporarily stored in a storage unit.

In step 1C, the first area is calculated by means of a calculating module that multiplies the width and the length obtained from the image data, thereby obtaining the first area datum. The first area datum obtained in step 1C is also temporarily stored in the storage unit.

When the first area defined by the seal line is calculated through step 1 shown in FIG. 3, step 2 shown in FIG. 3 is carried out so as to obtaining the first volume.

A first height of the seal line is measured in step 2. The first height is measured with respect to at least one location in the region enclosed by the seal line. The measured data are converted into first height data and temporarily stored in the storage unit. Preferably, the first height is measured at plural locations in the region enclosed by the seal line.

In step 3, the first area data obtained through step 1 are multiplied by the first height data measured in step 2 by means of the calculation module, thereby producing first volume data. The first volume data are temporarily stored in the storage unit.

Then, step 20 in FIG. 1 is carried out.

A second volume of spacers is obtained in step 20. The spacers are formed in the region enclosed by the seal line so as to seal liquid crystal.

The method for obtaining the second volume of the spacer may be changed depending on the kinds of the spacers. According to the present invention, two exemplary embodiments are proposed depending on the kinds of the spacers.

Embodiment 1

Figure 4:
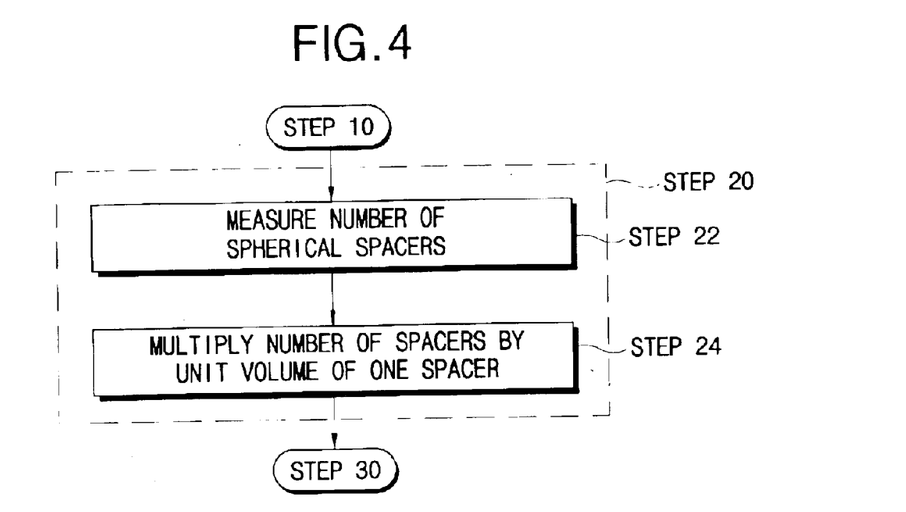
FIG. 4 is a flow chart showing a method of obtaining a second volume according to a first exemplary embodiment of the present invention.

FIG. 4 is a flow chart showing a method of obtaining a second volume according to a first exemplary embodiment of the present invention.

Referring to FIG. 4, the second volume is obtained through two steps 22 and 24.

The number of the spacers disposed in the region enclosed by the seal line is obtained in step 22. The spacers may have a spherical shape and may be randomly scattered in the region disposed on the first substrate.

Figure 5:
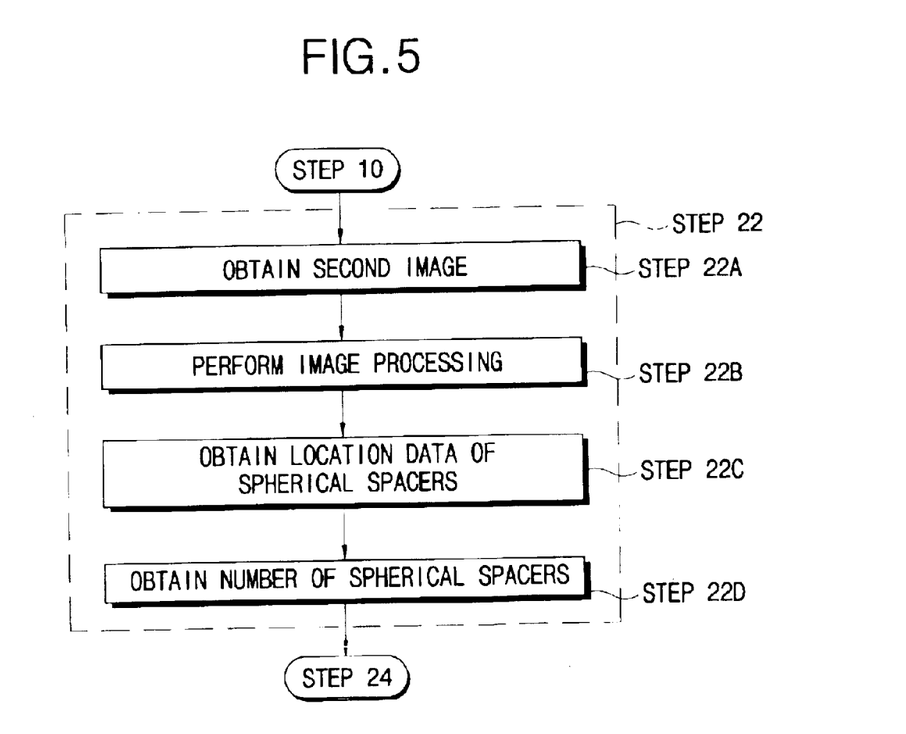
FIG. 5 is a flow chart showing a method of obtaining a number of spherical spacers according to a first exemplary embodiment of the present invention.

FIG. 5 is a flow chart showing a method of obtaining a number of spherical spacers according to a first exemplary embodiment of the present invention.

Referring to FIG. 5, the number of spacers can be obtained through steps 22A, 22B, 22C and 22D.

A second image of the spacers is obtained in step 22A. The spacers may have a spherical shape. The second image is temporarily stored in the storage unit.

In addition, in step 22B, the second image is transformed into image data by an image processing technique and are temporarily stored in the storage unit.

In step 22C, position data indicating each of the spherical spacers are indirectly obtained from the image data. The position data are temporarily stored in the storage unit. The position data represent coordinates indicating the positions of the spherical spacers.

Then, the number of spacers is calculated based on the position data stored in the storage unit in step 22D. The number of spacers is calculated by means of the calculating module to produce spacer number data. The spacer number data are temporarily stored in the storage unit.

After that, as shown in FIG. 4, step 24 is carried out to obtain the second volume.

In step 24, the number data of spherical spacers are multiplied by unit volume data of one spacer. The unit volume data are stored in the storage module in advance. The second volume data obtained from step 24 are temporarily stored in the storage unit.

Embodiment 2

Figure 6:
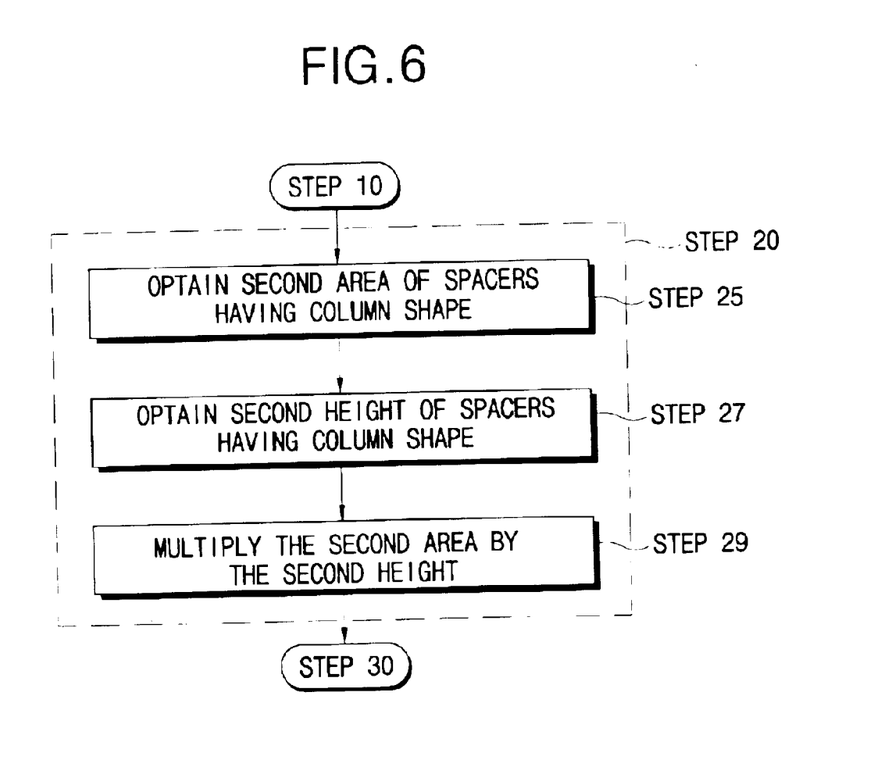
FIG. 6 is a flow chart showing the method of obtaining a second volume according to a second exemplary embodiment of the present invention.

FIG. 6 is a flow chart showing the method of obtaining a second volume according to a second exemplary embodiment of the present invention.

Referring to FIG. 6, the second volume is obtained through three steps 25, 27 and 29.

A second area of the spacers in the region enclosed by the seal line is obtained in step 25.

A predetermined number of spacers having a column shape are disposed at predetermined positions in the region enclosed by the seal line. The column-shape spacer may be formed through a process of patterning photosensitive material.

According to the preferred exemplary embodiment of the present invention, the spacer may have a cylindrical shape.

Figure 7:
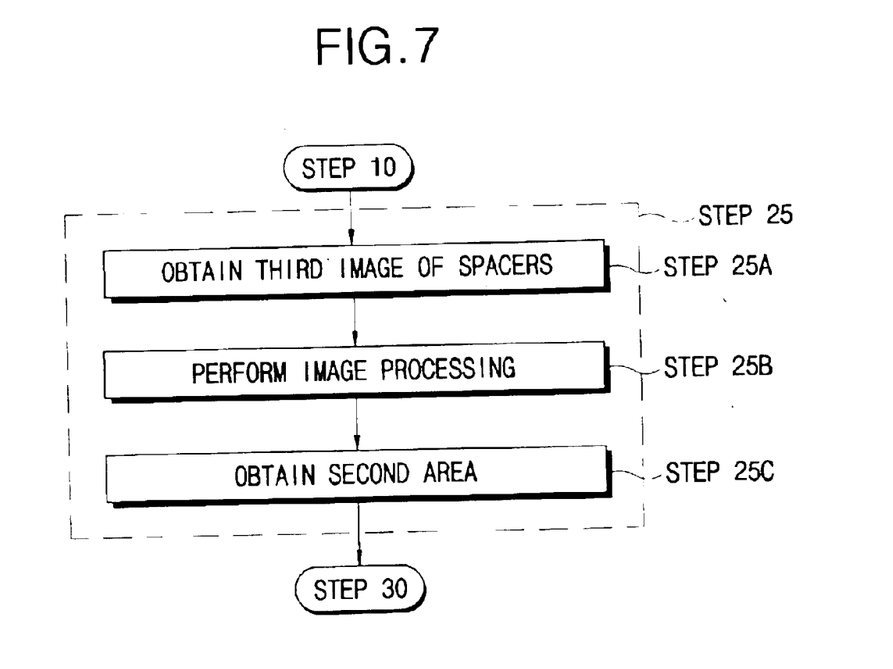
FIG. 7 is a flow chart showing a method of obtaining a second area of a spacer having a column shape according to a second exemplary embodiment of the present invention.

FIG. 7 is a flow chart showing a method of obtaining a second area of column-shape spacers according to a second exemplary embodiment of the present invention.

Referring to FIG. 7, the second area of the column-shape spacers is obtained through three steps 25A, 25B, and 25C.

A third image of the column-type spacers is obtained in step 25A. The third image is temporarily stored in the storage unit.

In step 25B, the third image is transformed into third image data by an image processing module. The third image data are temporarily stored in the storage unit.

In step 25C, the second area of each of the column-type spacers is obtained based on the third image data. The second area is calculated in the calculating module. The second area data calculated by the calculating module are temporarily stored in the storage unit.

Then, as shown in FIG. 6, step 27 is carried out so as to obtain the second volume.

A second height of each of the column-shape spacers is obtained in step 27. The second height data of each of the column-shape spacers are temporarily stored in the storage unit.

In step 29, the second area data are multiplied by the second height data in the calculation module, thereby obtaining the second volume data. The second volume data are temporarily stored in the storage unit.

Then, step 30 shown in FIG. 1 is carried out.

A third volume corresponding to a difference between the first volume of the seal line and the second volume of the spacers is obtained in step 30 based on the first and second volume data obtained through steps 10 and 20. The third volume is obtained by means of the calculation module and the third volume data are temporarily stored in the storage unit.

Then, step 40 shown in FIG. 1 is carried out.

In step 40, a predetermined amount of liquid crystal corresponding to the third volume is supplied into the region enclosed by the seal line. The amount of liquid crystal to be supplied is calculated based on a weight and a specific gravity of the liquid crystal.

For example, the region enclosed by the seal line may be provided with from about 95% to about 105%, preferably from about 95% to about 100%, of the predetermined amount of liquid crystal corresponding to the third volume.

Then, step 50 shown in FIG. 1 is carried out. In step 50, the first substrate is covered by a second substrate so as to seal the liquid crystal filled between the first and second substrates.

Hereinafter, a liquid crystal filling system according to one exemplary embodiment of the present invention will be described.

Figure 8:
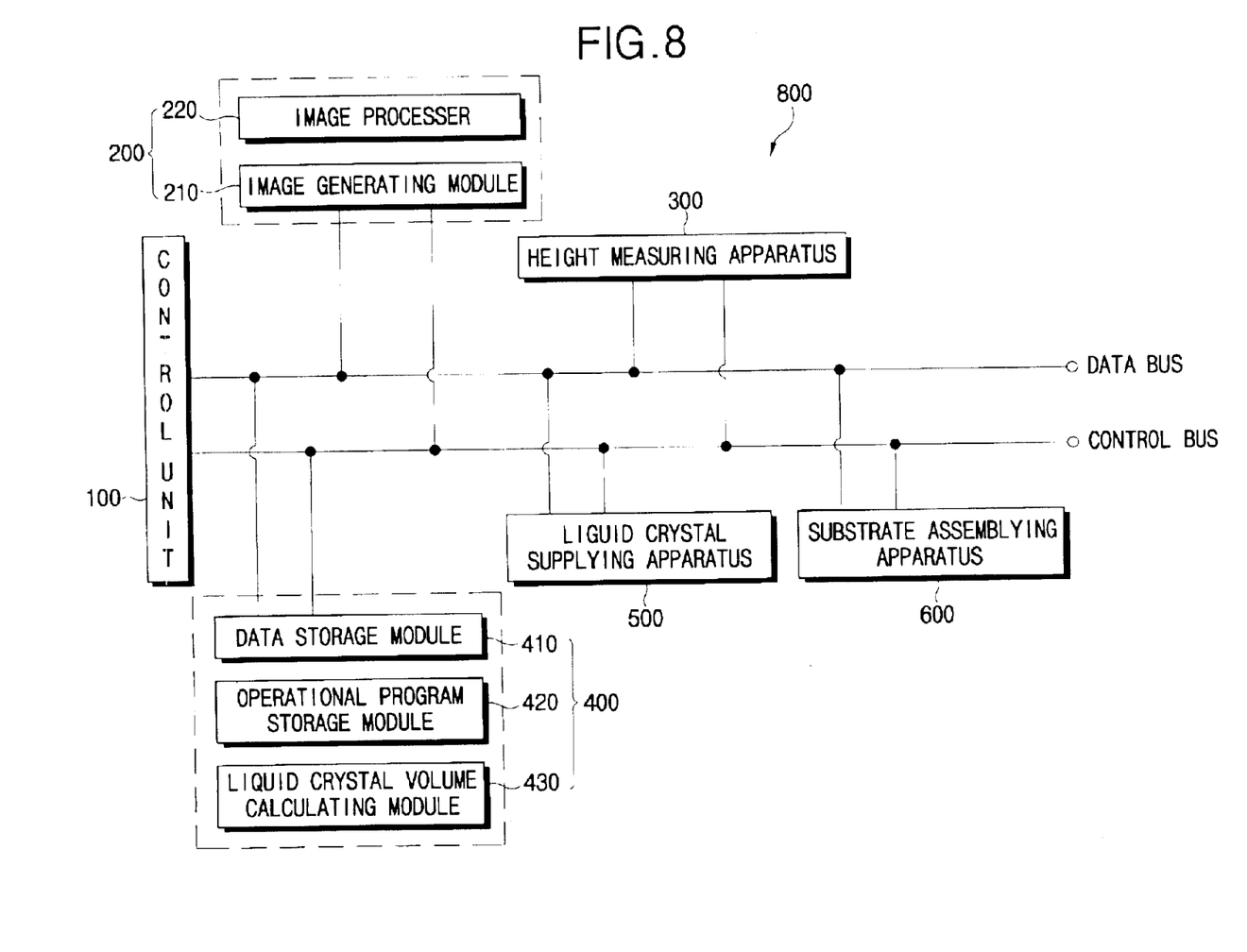
FIG. 8 is a block diagram showing a liquid crystal filling system according to one exemplary embodiment of the present invention.
Figure 9:
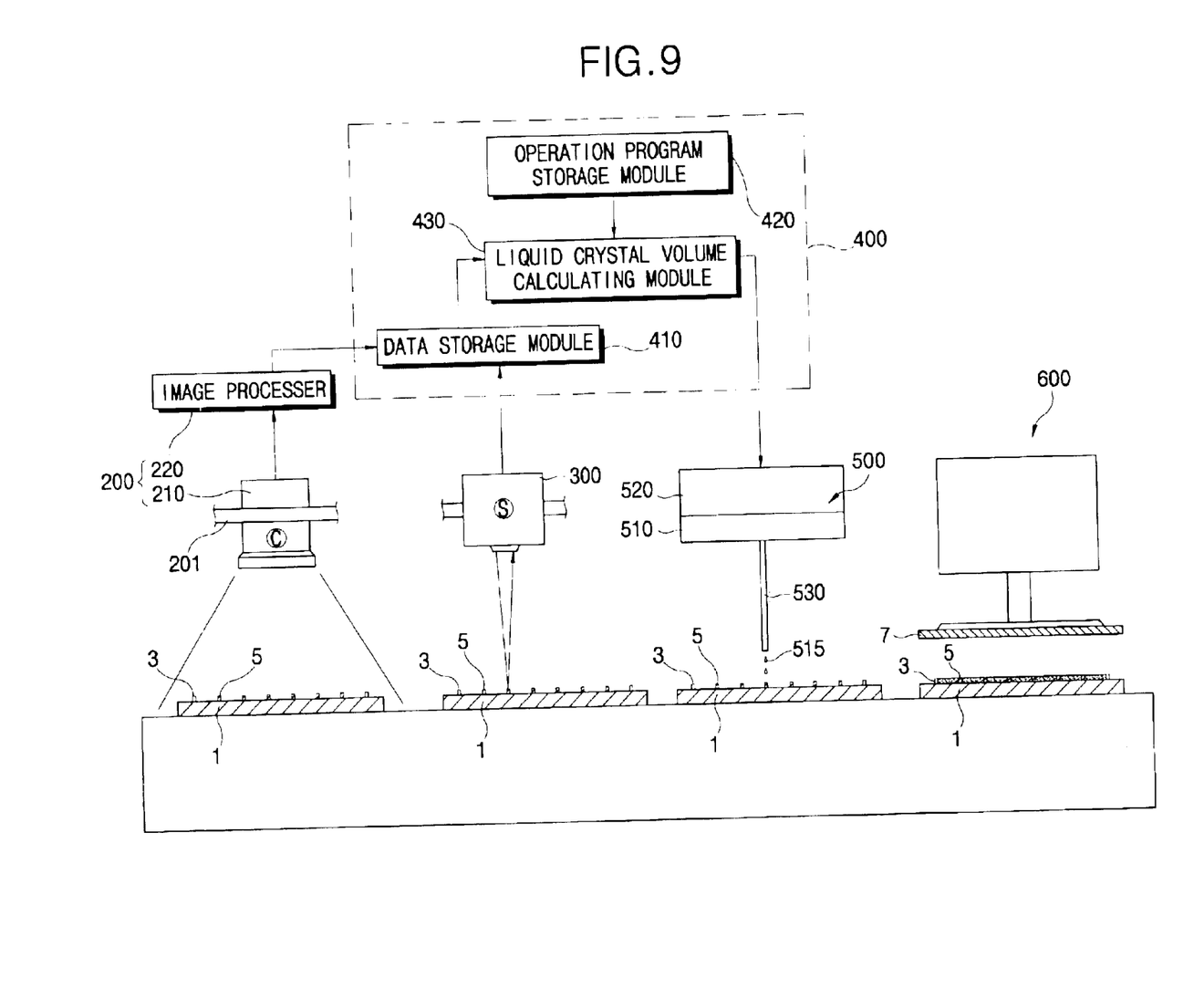
FIG. 9 is a schematic view showing a liquid crystal filling system according to one exemplary embodiment of the present invention.

FIG. 8 is a block diagram showing a liquid crystal filling system according to one exemplary embodiment of the present invention, and FIG. 9 is a schematic view showing a liquid crystal filling system according to one exemplary embodiment of the present invention.

Referring to FIGS. 8 and 9, a liquid crystal filling system 800 mainly includes a control unit 100, an image processing device 200, a height measuring apparatus 300, a liquid crystal volume calculating module 400, a liquid crystal supplying apparatus 500 and a substrate assembling apparatus 600.

The control unit 100 controls each component of the liquid crystal filling system 800. A control signal for controlling the control unit 100 is inputted and outputted through a control bus and a data signal is inputted and outputted through a data bus.

The image processing device 200 includes an image generating module 210 and an image processor 220.

Figure 10:
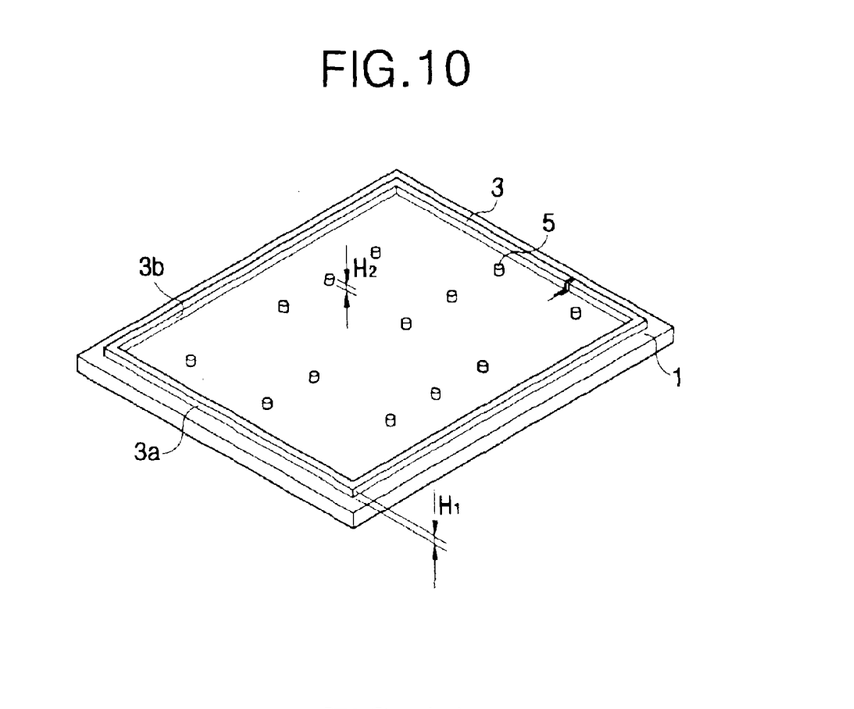
FIG. 10 is a perspective view showing a first substrate according to one exemplary embodiment of the present invention.

FIG. 10 is a perspective view showing a first substrate according to one exemplary embodiment of the present invention. The first substrate has reference numeral 1, and the seal line has reference numeral 3. In addition, the spacer has reference numeral 5.

The seal line 3 may have a strip shape and is aligned along edges of the first substrate 1. The seal line 3 has a closed-loop shape. Reference numeral 3a represents an outer surface of the seal line 3, and reference numeral 3b represents an inner surface of the seal line 3.

Referring to FIG. 9, the image generating module 210 of the image processing device 200 generates an image of the seal line 3 formed in the first substrate 1 and the spacers 5 formed in the region enclosed by the seal line 3.

The image generating module 210 may employ a charge coupled device (CCD) camera, which takes a photograph of an object to generate a digital image. In addition, the image processor 220 processes the image to extract desired data from the image.

Figure 11:
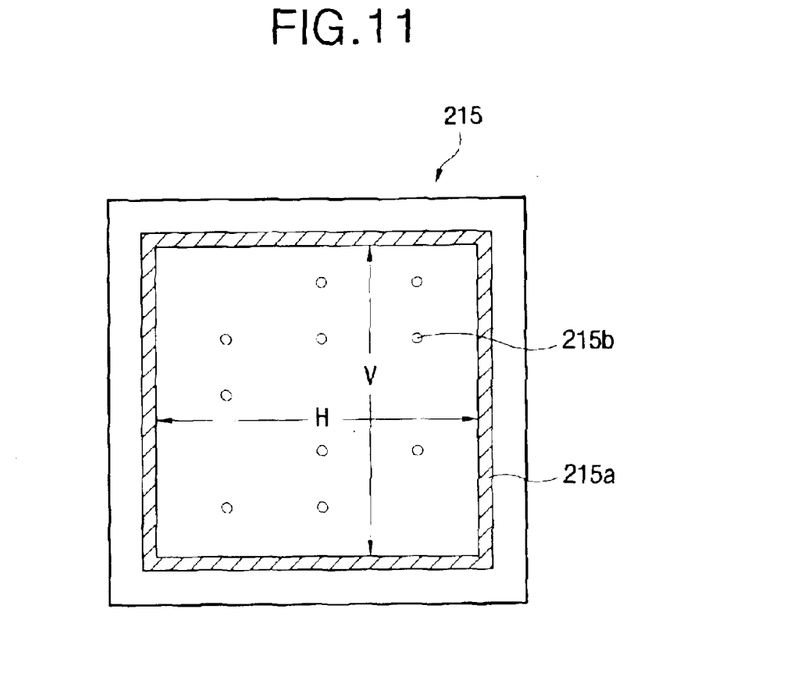
FIG. 11 shows an image generated by an image generating apparatus according to one exemplary embodiment of the present invention.

FIG. 11 shows an image generated by an image generating apparatus according to one exemplary embodiment of the present invention.

Referring to FIG. 11, the image processor 220 extracts first area data of a seal line 215a from an image 215. In addition, the image processor 220 extracts the number data of the spacers 215b or second area data from the image 215. The first area data include a distance H and a distance V. The distance H is a distance between the first sidewall and the second sidewall facing the first sidewall of the seal line 215a of the image 215, and the distance V is a distance between a third sidewall and a fourth sidewall facing the third sidewall of the seal line 215a.The height measuring apparatus 300 measures a height H1 of the seal line 3 and a height H2 of the spacer 5. The height measuring apparatus 300 projects a laser beam towards the first substrate 1 and measures the height H1, H2 of the seal line 3 and the spacer 5 by using a laser beam reflected from the seal line 3 and the spacers 5 formed on the first substrate 1. As shown in FIG. 9, the height measuring apparatus 300 is fixed to an X-Y table 201, and measures the height of the seal line 3 and the spacers 5 formed on the first substrate 1.

The liquid crystal volume calculating device 400 includes a data storing module 410, an operation program storing module 420 and a liquid crystal volume calculating module 430.

Referring to FIGS. 9 to 11, the data storing module 410 temporarily stores the first area data of the seal line 215a, second area data of the spacers 215b, and the spacer number data, which are produced by the image processor 220.

In addition, as shown in FIG. 9, the data storing module 410 temporarily stores the first height data of the seal line 3 and the second height data of the spacers 5, which are measured by the height measuring apparatus 300.

Besides, various data required for determining the amount of liquid crystal to be supplied to the liquid crystal display device are temporarily stored in the data storing module 410.

The operation program storing module 420 stores operation program required for calculating the amount of liquid crystal to be supplied to the liquid crystal display device.

The liquid crystal volume calculating module 430 loads the operation program stored in the operation program storing module 420, and reads out the first area data of the seal line, the second area data of the spacers, the first height data and the second height data stored in the data storing module 410 so as to calculate the amount of liquid crystal to be supplied into the liquid crystal display device.

Figure 12:
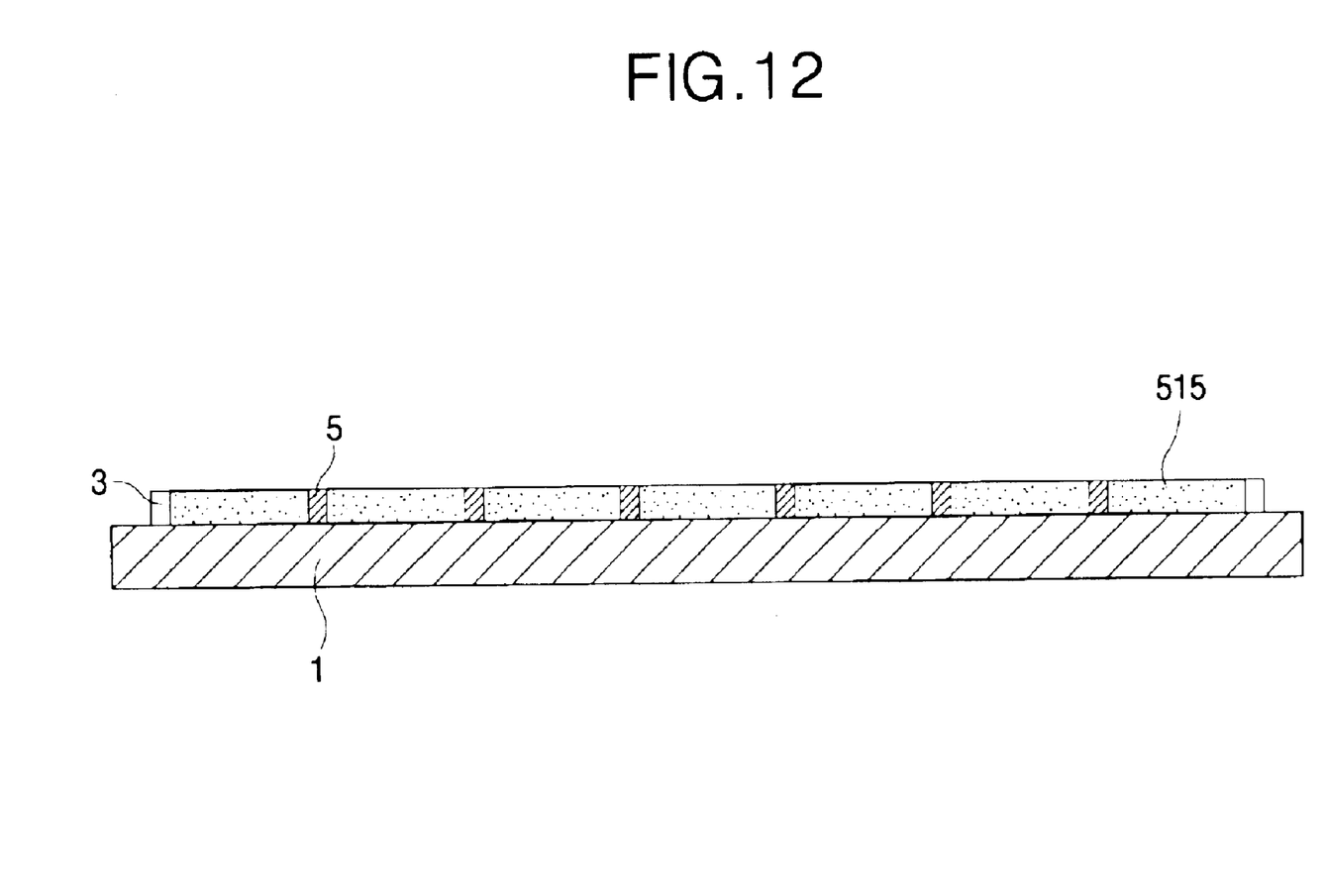
FIG. 12 is a schematic view showing liquid crystal supplied into inside a seal line for sealing the liquid crystal by means of a liquid crystal supplying apparatus.

FIG. 12 is a schematic view showing liquid crystal supplied into inside a seal line for sealing the liquid crystal by means of a liquid crystal supplying apparatus.

Referring to FIGS. 9 to 12, a liquid crystal supplying apparatus 500 supplies a predetermined amount, which corresponds to the liquid crystal volume determined by the liquid crystal volume determining module 430, of liquid crystal 515 into the region enclosed by the seal line 3. The liquid crystal supplying apparatus 500 includes a liquid crystal supplying tank 520, a controller 510 for controlling a flow rate of the liquid crystal and a liquid crystal dispenser 530.

For example, the liquid crystal supplying apparatus 500 may provide the region enclosed by the seal material with from about 95% to about 105%, preferably from about 95% to about 100%, of the liquid crystal volume determined by the liquid crystal volume determining module 430.

When the liquid crystal 515 has been filled in the region enclosed by the seal line formed on the first substrate 1, a second substrate 2 is placed on the first substrate 1 by the substrate assembling apparatus 600, such that the liquid crystal 515 is completely sealed between the first and second substrates 1 and 7.

As described above, according to the present invention, liquid crystal is filled between two substrates so that the number of the steps required for sealing the liquid crystal can be reduced, and the processing time required for sealing the liquid crystal can be minimized. In addition, bubbles generated while the liquid crystal is insufficiently filled between two substrates can be reduced, and overflowing of liquid crystal due to excessive amount of liquid crystal can be prevented.

While the present invention has been described in detail with reference to the preferred exemplary embodiments thereof, it should be understood to those skilled in the art that various changes, substitutions and alterations can be made hereto without departing from the scope of the invention as defined by the appended claims.

What is claimed is:

1. A method for manufacturing a liquid crystal display (LCD) panel, the LCD panel comprising a first substrate, a sealing wall formed on a peripheral portion of the first substrate, a plurality of spacers formed on the substrate and surrounded by the sealing wall, and a second substrate, the method comprising steps of:

obtaining a first volume of a space on the first substrate surrounded by the sealing wall, the step of obtaining the first volume comprising steps of:
  obtaining an area of the portion of the first substrate surrounded by the sealing wall;
  measuring a height of the sealing wall; and
  multiplying the area by the height;
obtaining a second volume occupied by the spacers;
obtaining a third volume by subtracting the second volume from the first volume;
calculating a first amount of liquid crystal corresponding to the third volume;
applying a second amount of the liquid crystal to the space, the second amount of the liquid crystal being equal to or substantially the same with the first amount; and
placing a second substrate over the first substrate,
wherein the step of obtaining the area comprising steps of:
  obtaining an image of the sealing wall;
  processing the image to produce image data; and
  calculating the area from the image data.

2. The method of claim 1, wherein the height of the sealing wall is measured from at least one location.

3. The method of claim 1, wherein the step of obtaining the second volume comprises steps of:
measuring a unit volume of the spacers;
measuring a number of the spacers; and
multiplying the number of the spacers by the unit volume of the spacers,
wherein the spacers have a spherical shape and are randomly scattered.

4. The method of claim 3, wherein the step of measuring the number of the spacers comprises steps of:
obtaining an image of the spacers;
processing the image to obtain locations of the spacers; and
counting a number of the locations.

5. The method of claim 1, wherein the step of obtaining the second volume comprises steps of:
obtaining an area occupied by the spacers;
measuring a height of spacer; and
multiplying the area occupied by the spacers by the height,
wherein the spacers have a column shape and are located at predetermined locations.

6. The method of claim 5, wherein the step of obtaining the area comprising steps of:
obtaining an image of the spacers; and
processing the image to calculate the area.

7. The method of claim 1, wherein the step of calculating the amount of the liquid crystal is calculated by multiplying the third volume by a specific gravity of the liquid crystal.

8. The method of claim 1, wherein the second amount is about 95% to about 105% of the first amount.

9. The method of claim 8, wherein the second amount is about 95% to about 100% of the first amount.

10. A liquid crystal filling system, comprising:
a first processing unit obtaining image data representing a sealing wall formed on a peripheral portion of a first substrate and a plurality of spacers formed on a portion of the first substrate surrounded by the sealing wall;
a measuring unit obtaining heights of the sealing wall and the spacers;
a second processing unit calculating an amount of liquid crystal corresponding to a space on the first substrate surrounded by the sealing wall based on the image data and the heights;
a liquid crystal dispensing unit applying liquid crystal to the space based on the calculated amount; and
an assembly unit placing a second substrate on the first substrate.

11. The liquid crystal filling system of claim 10, wherein the first processing unit includes a charge coupled device (CCD) camera generating the image data.

12. The liquid crystal filling system of claim 10, wherein the measuring unit includes a sensor measuring the heights of the sealing wall and the spacers.

13. The liquid crystal filling system of claim 10, wherein the liquid crystal dispensing unit comprises:
a liquid crystal flow rate controller; and
a liquid crystal dispenser applying the liquid crystal to the space.

14. The liquid crystal filling system of claim 10, wherein the second processing unit comprises:
a data storage;
an operation program storage; and
a volume calculation unit.

15. The liquid crystal filling system of claim 14, wherein the data storage stores data representing an area of the first substrate surrounded by the sealing wall, the height of the scaling wall, a unit area of the spacers, and a number of the spacers.

16. The liquid crystal filling system of claim 10, wherein the liquid crystal dispensing unit applies about 95% to about 105% of the amount of the liquid crystal corresponding to the space.

17. The liquid crystal filling system of claim 16, wherein the liquid crystal dispensing unit applies about 95% to about 100% of the amount of the liquid crystal corresponding to the space.

18. A method for manufacturing a liquid crystal display, comprising steps of:
forming a sealing wall on a peripheral portion of a substrate;
forming a plurality of spacers on a portion of the substrate surrounded by the sealing wall;
obtaining an image of the sealing wall;
processing the image to obtain a first volume of a first space on the portion of the substrate surrounded by the sealing wall;
obtaining a second volume of a second space occupied by the plurality of spacers;
obtaining a third volume by subtracting the second volume from the first volume;
calculating a first amount of liquid crystal corresponding to the third volume; and
applying a second amount of the liquid crystal to the first space, the second amount being equal to or substantially the same with the first amount.

19. The method of claim 18, wherein the step of processing the image comprises steps of:

processing the image to obtain an area of the portion of the substrate surrounded by the sealing wall;

processing the image to obtain a height of the sealing wall; and multiplying the area by the height to obtain the first volume.

20. A method for manufacturing a liquid crystal display, comprising steps of:

forming a sealing wall on a peripheral portion of a substrate;

forming a plurality of spacers on a portion of the substrate surrounded by the sealing wall;

obtaining a first volume of a space on the portion of the substrate surrounded by a sealing wall;

obtaining an image of the spacers;

processing the image to obtain a second volume occupied by the spacers;

obtaining a third volume by subtracting the second volume from the first volume;

calculating a first amount of liquid crystal corresponding to the third volume; and applying a second amount of the liquid crystal to the space, the second amount being equal to or substantially the same with the first amount.

21. The method of claim 20, wherein the spacers have a spherical shape and are randomly scattered.

22. The method of claim 21, wherein the step of processing the image comprises steps of:

obtaining a unit volume of the spacers;

obtaining a number of the spacers; and multiplying the unit volume of the spacers by the number of the spacers.

23. The method of claim 22, wherein the step of obtaining the number of the spacers comprises steps of:

identifying locations of the spacers; and counting the number of the locations of the spacers.

24. A method for manufacturing a liquid crystal display, comprising steps of:

forming a sealing wall on a peripheral portion of a substrate;

forming a plurality of spacers on a portion of the substrate surrounded by the sealing wall;

projecting a laser beam toward the substrate to obtain a first height of the sealing wall and a second height of the spacers;

obtaining a first volume of a first space on the portion surrounded by the sealing wall by using the first height;

obtaining a second volume of a second space occupied by the spacers by using the second height;

obtaining a third volume by subtracting the second volume from the first volume;

calculating a first amount of liquid crystal corresponding to the third volume; and applying a second amount of the liquid crystal to the first space, the second amount being equal to or substantially the same with the first amount.

25. The method of claim 24, wherein the first height and the second height are obtained by using the laser beam reflected from the sealing wall and the spacers, respectively.

26. The method of claim 25, wherein the spacers have a spherical shape and are randomly scattered on the portion of the substrate surrounded by the sealing wall.

27. The method of claim 26, wherein the step of obtaining the second volume comprises steps of:

obtaining a unit volume of the spacers;

counting a number of the spacers; and multiplying the unit volume of the spacers by the number of the spacers.

28. The method of claim 27, wherein the step of counting the number of spacers comprises steps of:

obtaining an image of the spacers;

processing the image to determine locations of the spacers; and counting the number of the locations.

29. The method of claim 25, wherein the spacers have a column shape and arranged on predetermined locations on the substrate.

30. The method of claim 29, wherein the step of forming a plurality of spacers comprises steps of:

forming a photoresist layer on the substrate; and patterning the photoresist layer to form the spacers at predetermined locations.

31. The method of claim 29, wherein the step of obtaining the second volume comprises steps of:

obtaining an area occupied by the spacers; and multiplying the area occupied by the spacers by the second height.

32. The method of claim 31, wherein the step of obtaining the area occupied by the spacers comprises steps of:

obtaining an image of the spacers; and processing the image to obtain the area occupied by the spacers.

33. The liquid crystal filling system of claim 10, wherein the liquid crystal dispensing unit project a laser beam toward the substrate to obtain the heights of the sealing wall and the spacers.

34. A method for manufacturing a liquid crystal display (LCD), comprising steps of:

forming a sealing wall on a peripheral portion of a first substrate;

forming a plurality of spacers on a portion of the first substrate surrounded by the sealing wall;

projecting a laser beam toward the first substrate to obtain a height of the spacers;

obtaining a first volume of a first space on the portion surrounded by the sealing wall;

obtaining a second volume of a second space occupied by the spacers by using the first height;

obtaining a third volume by subtracting the second volume from the first volume;

calculating a first amount of liquid crystal corresponding to the third volume;

applying a second amount of the liquid crystal to the first space, the second amount being equal to or substantially the same with the first amount; and placing a second substrate over the first substrate.

35. The method of claim 34, wherein the height is measured by the laser beam reflected from the spacer.

* * * * *